United States Patent [19]
Ohkawara

[11] Patent Number: 5,305,137
[45] Date of Patent: Apr. 19, 1994

[54] OPTICAL ISOLATOR AND METHOD FOR FABRICATING THE SAME

[75] Inventor: Kazuhide Ohkawara, Tokyo, Japan

[73] Assignee: Nec Corporation, Tokyo, Japan

[21] Appl. No.: 881,257

[22] Filed: May 11, 1992

[30] Foreign Application Priority Data

May 10, 1991 [JP] Japan ................... 3-105842

[51] Int. Cl.$^5$ ............... G02B 1/08; G02B 5/30
[52] U.S. Cl. .................. 359/281; 359/484; 359/900; 372/703; 501/15; 501/22
[58] Field of Search ........... 359/484, 485, 900, 280, 359/281, 282, 283; 372/703; 501/15, 22

[56] References Cited

U.S. PATENT DOCUMENTS

| | | | |
|---|---|---|---|
| 4,686,678 | 8/1987 | Ohta et al. | 372/33 |
| 5,040,863 | 8/1991 | Kawakami et al. | 359/484 |
| 5,046,798 | 9/1991 | Yagiu et al. | 385/34 |
| 5,128,956 | 7/1992 | Aoki et al. | 372/43 |
| 5,161,049 | 11/1992 | Tanno et al. | 359/281 |

FOREIGN PATENT DOCUMENTS

| | | | |
|---|---|---|---|
| 0176721 | 10/1984 | Japan | 359/484 |
| 0148918 | 7/1987 | Japan | 359/484 |
| 1200223 | 8/1989 | Japan . | |
| 4000410 | 1/1992 | Japan . | |
| 2217508 | 10/1989 | United Kingdom . | |

OTHER PUBLICATIONS

Shiraishi et al., *Applied Optics*, vol. 25, No. 2, pp. 311-314, Jan. 1986.
Seki et al, *Optical Isolators For Fiber-Optic Communications*, Feb. 27, 1970, pp. 25-30.

*Primary Examiner*—Bruce Y. Arnold
*Assistant Examiner*—R. D. Shafer
*Attorney, Agent, or Firm*—Foley & Lardner

[57] ABSTRACT

A polarizer, a Faraday rotator and an analyzer are fixed by fused glass applied on an outer periphery of the polarizer to be contacted with the Faraday rotator and on an outer periphery of the analyzer to be contacted with the Faraday rotator. No adhesive exists between contact planes of the polarizer and the Faraday rotator and those of the Faraday rotator and the analyzer.

2 Claims, 4 Drawing Sheets

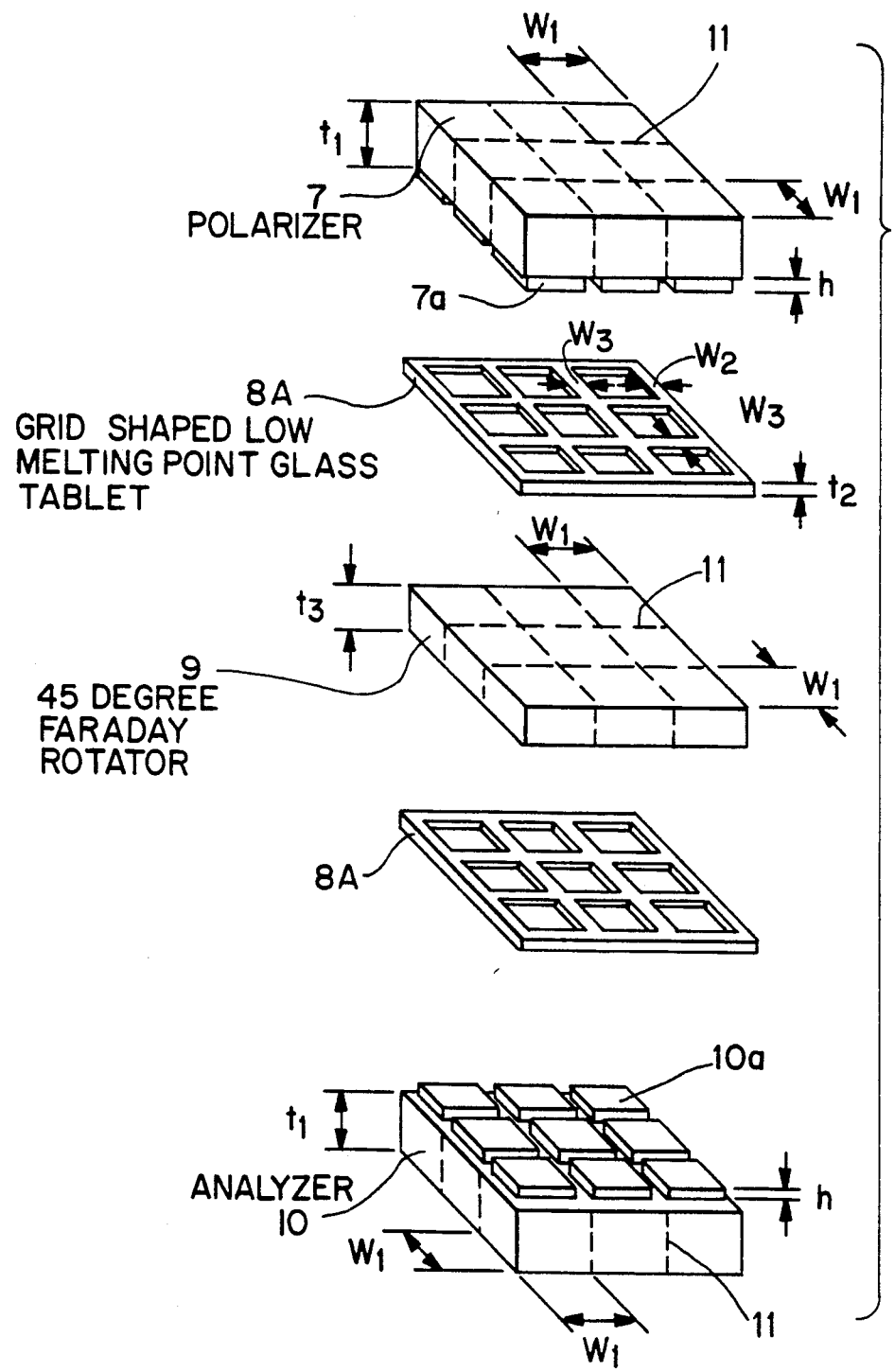

OPTICAL ISOLATOR AND METHOD FOR FABRICATING THE SAME

FIELD OF THE INVENTION

This invention relates to an optical isolator to be used for an optical communication system, an optical information processing system, etc. in accordance with magneto-optic effect, and a method for fabricating the same.

BACKGROUND OF THE INVENTION

One type of a conventional optical isolator comprises a polarizer, a 45 degree - Faraday rotator, and an analyzer which are fixed by applying optic adhesive between the polarizer and the Faraday rotator and between the Faraday rotator and the analyzer, and a magnet which is fixed to an outer periphery of the Faraday rotator by use of adhesive.

In operation, incident light is supplied to the polarizer of the optical isolator, so that a polarization component of the incident light coinciding with a polarization plane of the polarizer is passed through the polarizer to be supplied to the Faraday rotator, from which a light having a polarization rotated by 45 degrees is supplied. The light having the polarization rotated by 45 degrees is passed through the analyzer, so that output light is supplied from the analyzer of the optical isolator. On the contrary, return light propagating in the direction opposite to that of the incident light is stopped by the polarizer, after it is passed through the analyzer and the Faraday rotator. The detailed structure and operation will be explained later.

According to the conventional optical isolator, however, there is a disadvantage in that anti-humidity property is not so high, because the polarizer, the Faraday rotator and the analyzer are fixed on optical planes by the optic adhesive. Thus the conventional optical isolator does not operate satisfactorily under high temperature and high humidity.

SUMMARY OF THE INVENTION

Accordingly, it is an object of the invention to provide an optical isolator having improved anti-humidity property, and a method for fabricating the same.

It is a further object of the invention to provide an optical isolator which can be used under high temperature and high humidity, and a method for fabricating the same.

It is a still further object of the invention to provide an optical isolator which operates with stabilized characteristics even under high temperature and high humidity, and a method for fabricating the same.

According to a first feature of the invention, an optical isolator, comprises:

a polarizer for propagating light having a predetermined polarization;

a Faraday rotator for rotating the predetermined polarization of the light by a predetermined angle;

an analyzer for propagating light having a polarization rotated relative to a polarization plane of the polarizer by the predetermined angle; and a magnet provided on an outer periphery of the Faraday rotator to apply a magnetic field to the Faraday rotator;

wherein the polarizer and the Faraday rotator are fixed by a first glass applied on at least one of outer peripheries of the polarizer and the Faraday rotator; and the Faraday rotator and the analyzer are fixed by a second glass applied on at least one of outer peripheries of the Faraday rotator and the analyzer.

According to a second feature of the invention, a method for fabricating an optical isolator, comprises the steps of:

providing a polarizer substrate, a Faraday rotator substrate, and an analyzer substrate;

providing first and second grid shaped glass tablets which are pre-sintered (hereinafter defined "halfly sintered");

forming grooves on a surface of the polarizer and a surface of the analyzer, the grooves coinciding with a pattern of the grid shaped glass tablets, and the surfaces of the polarizer and the analyzer being for contact with the Faraday rotator;

interposing the first grid shaped glass tablet between the polarizer and the Faraday rotator, and the second grid shaped glass tablet between the Faraday rotator and the analyzer, the first and second grid shaped glass tablets being positioned in the grooves on the surfaces of the polarizer and the analyzer, thereby fixing the polarizer, the Faraday rotator, and the analyzer to provide an assembled structure by melting the first and second grid shaped glass tablets;

cutting the assembled structure along the grooves by a cutting margin narrower than a width of the grooves to provide a plurality of optical isolator elements, each of the optical isolator elements being composed of a polarizer, a Faraday rotator and an analyzer, the polarizer and the Faraday rotator being fixed on at least one of outer peripheries thereof by a glass cut from the first grid shaped glass tablet, and the Faraday rotator and the analyzer being fixed on at least one of outer peripheries thereof by a glass cut from the second grid shaped glass tablet; and providing a magnet on an outer periphery of the Faraday rotator of the optical isolator element.

BRIEF DESCRIPTION OF THE DRAWINGS

This invention will be explained in more detail in conjunction with appended drawings, wherein;

FIGS. 3A to 3D are perspective views showing a method for fabricating an optical isolator of a preferred embodiment according to the invention.

DESCRIPTION OF THE PREFERRED EMBODIMENTS

Figure 1A:
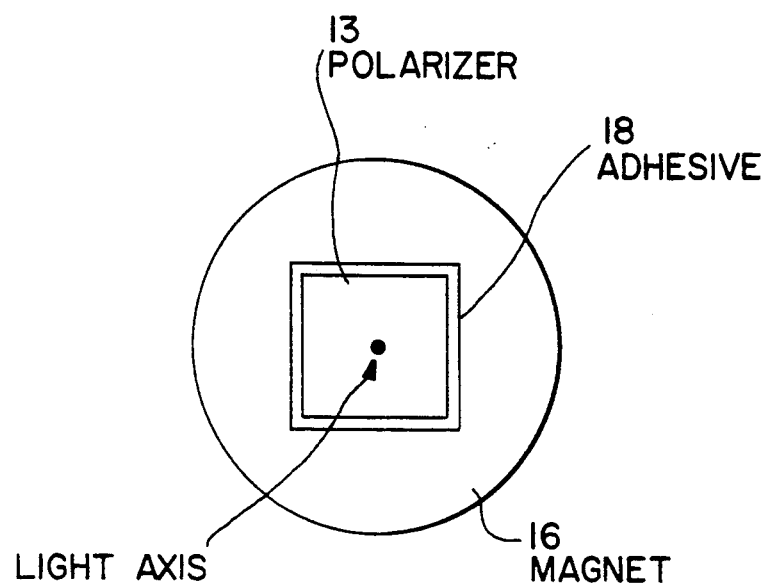
FIGS. 1A and 1B are a front view and a cross sectional view, respectively, showing a conventional optical isolator.
Figure 1B:
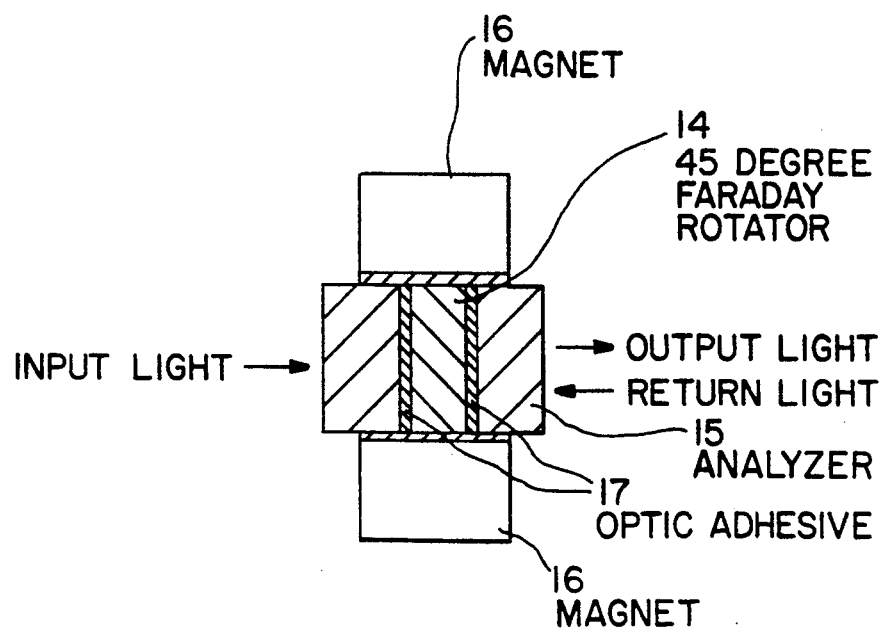

Before explaining an optical isolator of a preferred embodiment according to the invention, the aforementioned conventional optical isolator will be explained in FIGS. 1A and 1B.

The conventional optical isolator comprises a polarizer 13, a 45 degree - Faraday rotator 14, an analyzer 15, and a magnet 16, wherein the polarizer 13, the 45 degree - Faraday rotator 14, and the analyzer 15 are fixed on their facing optical planes by use of optic adhesive 17, and the magnet 16 is fixed on an outer periphery of the 45 degree - Faraday rotator 14 by use of adhesive 18. In this conventional optical isolator, the 45 degree - Faraday rotator 14 has a length along light axis, so that light to be propagated therethrough is rotated in its polarization plane in accordance with Faraday effect by 45 degrees, and the rotation of polarization plane is dependent on non-reciprocity property of Faraday effect, in which the rotational direction of incident light polarization is determined by an inherent property of the Faraday rotator 14, and a state of parallel or non-parallel between light propagation direction and a magnetic field. This Faraday rotator 14 is often made in an optical communication system of YIG (yttrium iron garnet) or (RBi) IG (Bi-substituted rare earth iron garnet).

In operation, input light (solid line arrow) is supplied to the polarizer 13, so that light having a polarization component in coincidence with a polarization plane of the polarizer 13 is selected to be supplied to the 45 degree - Faraday rotator 14. Thus, light which is propagated through the 45 degree - Faraday rotator 14 has a polarization rotated relative to the input light by 45 degrees. Here, it is assumed that a polarization plane of the analyzer 15 is set to be inclined relative to the polarization plane of the polarizer 13 by 45 degrees. Under this assumption, light supplied from the Faraday rotator 14 is propagated through the analyzer 15 without any loss. Thus, output light (solid line arrow) is supplied from the analyzer 15.

On the other hand, when return light (broken line arrow) is supplied to the analyzer 15, light having a polarization which is rotated relative to the polarization plane of the polarizer 13 by 45 degrees is selected to be supplied to the 45 degree - Faraday rotator 14, the light having the polarization rotated relative to the polarization plane of the polarizer 13 by 45 degrees is propagated through the Faraday rotator 14 to be further rotated in accordance with non-reciprocity property thereof by 45 degrees. Thus, only light having a polarization rotated by 90 degrees is supplied to the polarizer 13, so that no return light is propagated through the polarizer 13. Consequently, all the return light is interrupted by the optical isolator.

However, the conventional optical isolator has the disadvantage as explained before.

Figure 2A:
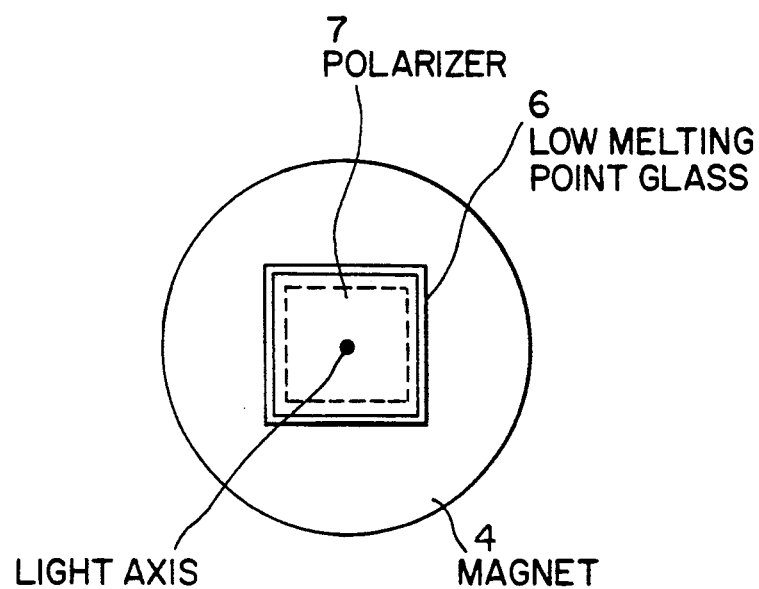
FIGS. 2A and 2B are a front view and a cross sectional view, respectively, showing an optical isolator of a preferred embodiment according to the invention.
Figure 2B:
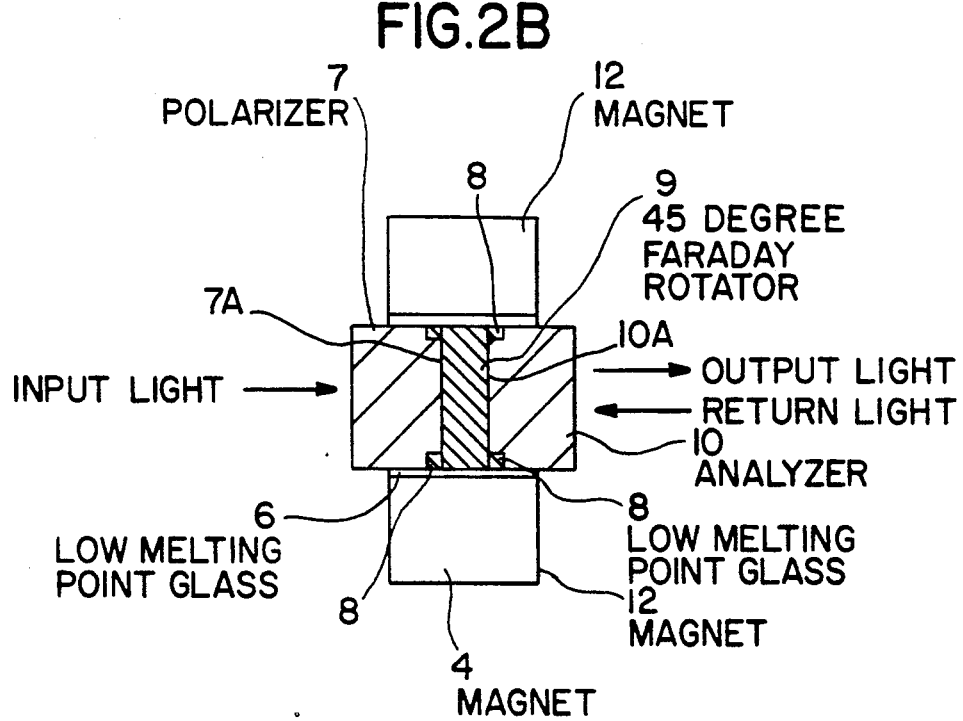

Next, an optical isolator of a preferred embodiment according to the invention will be explained in FIGS. 2A and 2B.

The optical isolator comprises a polarizer 7, a 45 degree - Faraday rotator 9, an analyzer 10, and a magnet 4, wherein the polarizer 7 and the Faraday rotator 9 are fixed on their optic planes by use of a low melting point glass 8 surrounding an end portion 7a of the polarizer 7, and the Faraday rotator 9 and the analyzer 10 are also fixed on their optic planes by use of a low melting point glass 8 surrounding an end portion 10a of the analyzer 10, while the magnet 12 is fixed on an outer periphery of the polarizer 7, the Faraday rotator 9 and the analyzer 10 thus fixed by use of a low melting point glass 6.

In this optical isolator, a polarization plane of the analyzer 10 is arranged to be rotated relative to that of the polarizer 7, and the 45 degree - Faraday rotator 9 is made of a thick film of $(GdBi)_3 Fe_5O_{12}$ (Bi-substituted gadolinium iron garnet), a thick film of $(GdBi)_3 (FeAlGa)_5O_{12}$ (Bi-substituted gadolinium iron aluminium gallium garnet), etc. obtained, for instance, by liquid phase epitaxy.

In general, (RBi) IG (Bi-substituted rare earth iron garnet) is large in Faraday rotation coefficient and small in saturation magnetization, so that a small sized optical isolator can be realized by use of it. In this preferred embodiment, an optical isolator having a diameter of 4 mm and a length of 3 mm is realized.

In this preferred embodiment, the low melting point glass 6 has a melting point lower than that of the low melting point glass 8. The assembly of the polarizer 7, the 45 degree - Faraday rotator 9 and the analyzer 10 fixed beforehand and the magnet 12 is carried out at a temperature lower than the melting point of the low melting point glass 8 and higher than that of the low melting point glass 6. Under this process condition, the disassembling of the polarizer 7, the Faraday rotator 9 and the analyzer 10 is avoided.

In this preferred embodiment, anti-reflection films for air are provided on light input and output planes of the polarizer 7, the 45 degree - Faraday rotator 9, and the analyzer 10.

In operation, input light (solid line arrow) is supplied to the polarizer 7 of the optical isolator, so that output light (solid line arrow) having a polarization rotated relative to a polarization plane of the polarizer 7 by 45 degrees is supplied from the analyzer 10 of the optical isolator, in the same principle as explained in the conventional optical isolator. On the other hand, return light (broken line arrow) is interrupted so as not to be propagated through the optical isolator.

Then, a method for fabricating an optical isolator of a preferred embodiment according to the invention will be explained in FIGS. 3A to 3D.

Figure 3B:
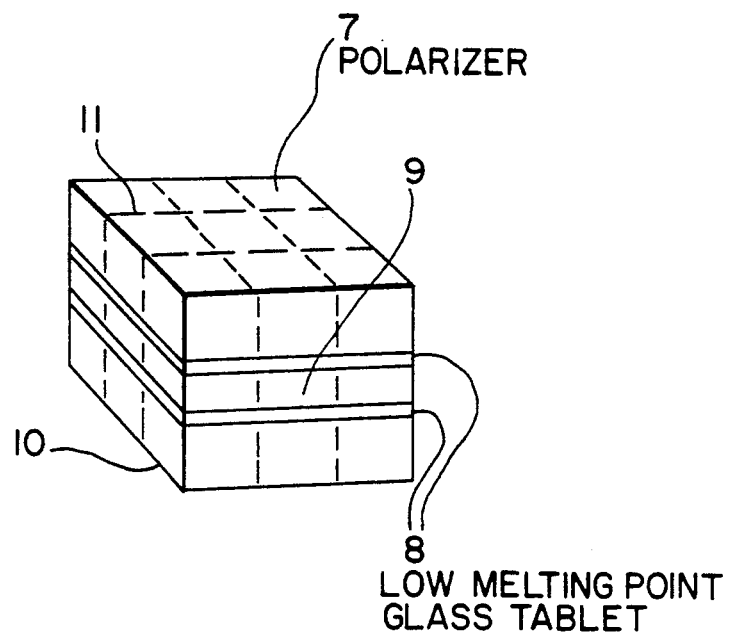

In FIG. 3A, a polarizer substrate having a plurality of polarizers 7 each defined by cutting lines 11 and having an end portion 7a, a 45 degree - Faraday rotator substrate having the plurality of 45 degree - Faraday rotators 9 each defined by cutting lines 11, and an analyzer substrate having the plurality of analyzers 10 each defined by cutting liens and having an end portion 10a are assembled by using first and second half-sintered grid shaped low melting point glass tablets 8A which are respectively interposed between the polarizer and Faraday rotator substrates and between the Faraday rotator and analyzer substrates, such that the end portions 7a and 10a of the polarizer and analyzer substrates are accommodated in openings of the grid shaped low melting point glass tablets 8A. Thus, an assembled structure is obtained, as shown in FIG. 3B, in accordance with the fixing of the polarizer, 45 degree - Faraday rotator and analyzer substrates by thermal treatment applied to the glass tablets 8A at a temperature of 450° C.

Figure 3C:
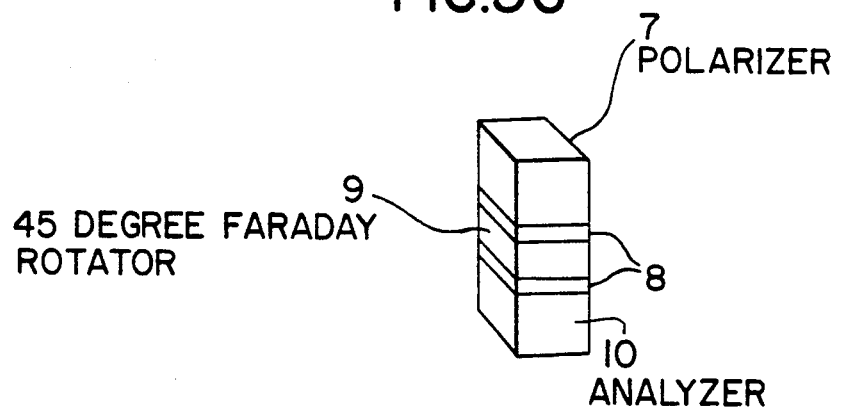

In FIG. 3C, the assembled structure is cut to be separated by the cutting lines 11. In this separated structure, the analyzer 10 is fabricated in advance to have a polarization plane rotated relative to a polarization plane of the polarizer 7 by 45 degrees. In addition, the polarizer 7, the 45 degree - Faraday rotator 9 and the analyzer 10 are stacked, such that the analyzer 10 coincides in rotational direction of polarization plane with the 45 degree - Faraday rotator 9, and anti-reflection films for air are provided on facing optical planes of the polarizer 7, the 45 degree - Faraday rotator 9 and the analyzer 10.

As shown in FIG. 3A, the polarizer substrate and the analyzer substrate have the end portions 7a and 10a which are defined by grid shaped grooves. The grooves are provided to correspond to the cutting lines 11 in accordance with the shaving by use of a precise blade saw having a thickness of less than 0.2 mm. A depth of the grooves is smaller than a thickness of the grid shaped low melting point glass tablets 8A, so that the grid shaped low melting point glass tablets 8A are well contacted with the contacting portions of the polarizer, 45 degree - Faraday rotator and analyzer substrates.

In this preferred embodiment, the depth of the grooves for defining the end portions 7a and 10a is 0.3 mm, and the thickness of the glass tablets 8A is 0.35 mm. The dimensions described here and other dimensions as shown in FIG. 3A are as follows.

$W_1 = 1.9$ mm
$W_2 = 0.2$ mm
$W_3 = 0.6$ mm
$t_1 = 1.3$ mm
$t_2 = 0.35$ mm
$t_3 = 0.35$ mm
$h = 0.30$ mm

A width of the grooves for defining the end portions 7a and 10a is determined dependent on the width $W_3$ of frames of the glass tablets 8A.

In assembling each member as shown in FIG. 3A, the glass tablets 8A are required to be handled in such a manner that the glass tablets 8A are not broken, when they are mounted on the analyzer substrate, and subsequently on the 45 degree - Faraday rotator substrate that assembly is performed by means of an automatic assembling apparatus.

In FIG. 3C, the aforementioned separated structure is obtained in accordance with the separation of the assembled structure along the cutting lines 11 positioned over the central lines of the frames of the glass tablets 8A by use of a blade having a thin width. Thus, optical isolator elements each having the polarizer 7, the 45 degree - Faraday rotator 9 and the analyzer 10 which are assembled by the low melting point glasses 8 fixed on the outer peripheries of the end portions 7a and 10a thereof between the polarizer and Faraday rotator substrates and between the Faraday rotator and analyzer substrates. A size of this optical isolator element is 1.7 mm in height and 3 mm in length.

Figure 3D:
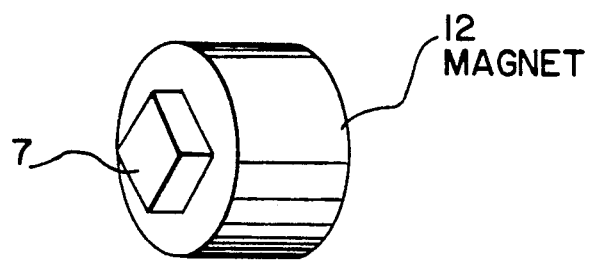

In FIG. 3D, this optical isolator element is fixed to the magnet 12, on the central axis of the magnet 12, by use of a low melting point glass 6 (see FIGS. 2A and 2B) applied between an outer periphery of the optical isolator element and an inner periphery of the magnet 12. The low melting point glass 6 has a melting point lower than that of the low melting point glass 8, as explained before. Thus, the optical isolator is fabricated, as shown in FIGS. 2A and 2B.

In this optical isolator, there are advantages in that anti-humidity property is improved, and stabilized characteristics of the optical isolator make it possible to use the optical isolator under high temperature and high humidity are obtained. These improvements are due to the use of the low melting point glasses 8 on the outer peripheries of the end portions of the polarizer 7 and the analyzer 10 to fix the polarizer 7, the 45 degree - Faraday rotator 9 and the analyzer 10.

The 45 degree Faraday rotator 9 may be provided with the end portions having concave peripheries for adhesive on the both sides thereof into which the low melting point glasses 8 are applied in place of the polarizer 7 and the analyzer 10. Further, the dimensions as described before may be changed dependent on the design of an optical isolator.

In this preferred embodiment, although the low melting point glass tablet 8A is used, it may be replaced by low melting point glass filled into grooves for defining the end portions of the polarizer 7 and the analyzer 10.

Although the invention has been described with respect to a specific embodiment for complete and clear disclosure, the appended claims are not to be thus limited but are to be construed as embodying all modifications and alternative constructions that may occur to one skilled in the art which fairly fall within the basic teaching set forth herein.

What is claimed is:

1. A method for fabricating an optical isolator, comprising the steps of:

providing a polarizer substrate, a Faraday rotator substrate, and an analyzer substrate;

providing first and second grid shaped glass tablets which are halfly sintered;

forming grooves on a surface of said polarizer and a surface of said analyzer substrate, said grooves coinciding with a pattern of said grid shaped glass tablets, and said surfaces of said polarizer substrate and said analyzer substrate being in contact with said Faraday rotator substrate;

interposing said first grid shaped glass tablet between said polarizer substrate and said Faraday rotator substrate, and said second grid shaped glass tablet between said Faraday rotator substrate and said analyzer substrate, said first and second grid shaped glass tablets being positioned in said grooves on said surfaces of said polarizer substrate and said analyzer substrate, thereby fixing said polarizer substrate, said Faraday rotator substrate, and said analyzer substrate to provide an assembled structure by melting said first and second grid shaped glass tablets;

cutting said assembled structure along said grooves by a cutting margin narrower than a width of said grooves to provide a plurality of optical isolator elements, each of said optical isolator elements being composed of a polarizer, a Faraday rotator and an analyzer, at least one of outer peripheries of each of said polarizer substrate and said Faraday rotator substrate being fixed on glass cut from said first grid shaped glass tablet, and at least one of outer peripheries of each of said Faraday rotator substrate and said analyzer substrate being fixed on glass cut from said second grid shaped glass tablet; and providing a magnet on an outer periphery of said Faraday rotator of said optical isolator element.

2. A method for fabricating an optical isolator, comprising the steps of:

providing a polarizer substrate, a Faraday rotator substrate, and an analyzer substrate;

forming grooves on a surface of said polarizer and a surface of said analyzer substrate, said grooves being of a grid shaped pattern, and said surfaces of said polarizer substrate and said analyzer substrate being in contact with said Faraday rotator substrate;

filling glass into said grooves of said polarizer substrate and said analyzer substrate, thereby fixing said polarizer substrate, said Faraday rotator substrate, and said analyzer substrate to provide an assembled structure by melting said glass;

cutting said assembled structure along said grooves by a cutting margin narrower than a width of said grooves to provide a plurality of optical isolator elements, each of said optical isolator elements being composed of a polarizer, a Faraday rotator and an analyzer, at least one of outer peripheries of each of said polarizer substrate and said Faraday rotator substrate being fixed on said glass filled into said grooves of said analyzer substrate, and said at least one of outer peripheries of each of Faraday rotator substrate and said analyzer substrate being fixed on said glass filled into said grooves of said analyzer substrate; and providing a magnet on an outer periphery of said Faraday rotator of said optical isolator element.

* * * * *